US012560735B2

(12) United States Patent
Dorrington et al.

(10) Patent No.: US 12,560,735 B2
(45) Date of Patent: Feb. 24, 2026

(54) SEISMIC DATA FILTERING TECHNIQUES

(71) Applicant: Schlumberger Technology Corporation, Sugar Land, TX (US)

(72) Inventors: Tracy Dorrington, Houston, TX (US); Aaron Scollard, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 375 days.

(21) Appl. No.: 18/355,893

(22) Filed: Jul. 20, 2023

(65) Prior Publication Data

US 2025/0028067 A1 Jan. 23, 2025

(51) Int. Cl.
*G01V 1/36* (2006.01)

(52) U.S. Cl.
CPC .......... *G01V 1/364* (2013.01); *G01V 2210/63* (2013.01)

(58) Field of Classification Search
CPC ........................... G01V 1/364; G01V 2210/63
See application file for complete search history.

(56) References Cited

U.S. PATENT DOCUMENTS

| | | | |
|---|---|---|---|
| 12,007,516 B2 | 6/2024 | Dorrington | |
| 2009/0037115 A1* | 2/2009 | Magill ..................... | G01V 1/30 |
| | | | 702/14 |
| 2020/0292722 A1* | 9/2020 | Maucec ................. | G01V 20/00 |
| 2024/0062119 A1* | 2/2024 | Bisht ..................... | G06N 20/20 |
| 2024/0062124 A1* | 2/2024 | Bisht ................. | G06Q 10/0631 |

* cited by examiner

*Primary Examiner* — Manuel A Rivera Vargas
(74) *Attorney, Agent, or Firm* — Jeffrey D. Frantz

(57) ABSTRACT

A method includes receiving a plurality of seismic data. The method also includes generating a plurality of seismic reports each having an arrangement of different subsets of the plurality of seismic data. Further, the method includes determining a quality score associated with each seismic report of the plurality of seismic reports. Further still, the method includes generating a seismic data filtering model based on the quality scores of the plurality of seismic reports, wherein the seismic data filtering model stores relationships between the quality scores and the seismic data.

20 Claims, 7 Drawing Sheets

50

RECEIVE SEISMIC DATA ~52

GENERATE SEISMIC REPORT
USING SEISMIC DATA ~54

DETERMINE QUALITY SCORE ASSOCIATED
WITH SEISMIC REPORTS ~56

GENERATE MODEL USING THE SEISMIC
REPORTS AND QUALITY SCORE ~58

RECEIVE SEISMIC DATA ~62

GENERATE SEISMIC REPORT
USING SEISMIC DATA ~64

FILTER SEISMIC REPORTS USING SEISMIC
DATA FILTERING MODEL TO GENERATE
SUBSET OF SEISMIC REPORTS ~66

PROVIDE SUBSET OF SEISMIC REPORTS ~68

FIG. 4

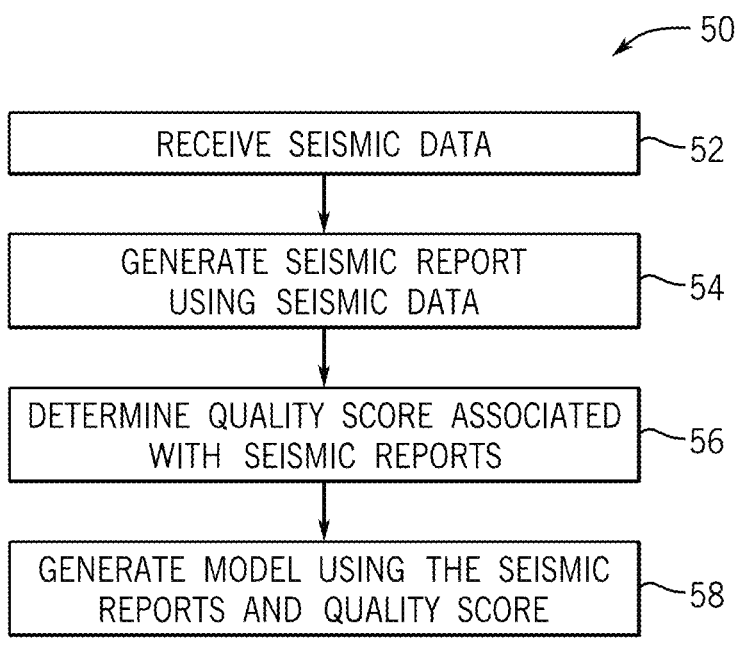

SEISMIC DATA FILTERING TECHNIQUES

INTRODUCTION

This disclosure relates generally to a system and method for generating a filtered seismic data output based on identified features in seismic data.

BACKGROUND

Oil and gas enterprises may utilize resource data from a variety of sources, such as certain governments (e.g., local or national), the oil and gas enterprises' own resource data, and resource data acquired by other oil and gas enterprises. The resource data may span a variety of resources including schematics and energy usage of power plants, seismic data (two-dimensional (2D) seismic data or three-dimensional (3D) seismic data), well logs, renewable or alternative energy sources, and the like. In any case, the resource data can cover a broad range of sources and topics that may make it difficult for a user to analyze the resource data. As such, it may be advantageous to provide techniques that make it easier for the user to analyze the data.

This section is intended to introduce the reader to various aspects of art that may be related to various aspects of the present techniques, which are described and/or claimed below. This discussion is believed to be helpful in providing the reader with background information to facilitate a better understanding of the various aspects of this disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

One aspect of the present disclosure is directed to a method. The method includes receiving a plurality of seismic data. The method also includes generating a plurality of seismic reports each having an arrangement of different subsets of the plurality of seismic data. Further, the method includes determining a quality score associated with each seismic report of the plurality of seismic reports. Further still, the method includes generating a seismic data filtering model based on the quality scores of the plurality of seismic reports, wherein the seismic data filtering model stores relationships between the quality scores and the seismic data.

One aspect of the present disclosure relates to a method. The method includes receiving a plurality of seismic data. The method also includes generating a plurality of seismic reports using the plurality of seismic data, wherein each seismic report of the plurality of seismic reports comprises a different subset of the plurality of seismic data. Further, the method includes providing the plurality of seismic reports as input to a seismic data filtering model wherein the seismic data filtering model stores relationships between quality scores and the seismic data. Further still, the method includes receiving, as an output of the seismic data filtering model, a filtered subset of the seismic reports.

One aspect of the present disclosure relates to a system. The system includes one or more processors and a memory storing instructions that, when executed by the one or more processors, are configured to cause the one or more processors to perform operations comprising receiving a plurality of seismic data. The instructions, when executed, also cause the one or more processors to determine a first subset of the plurality of seismic data having a first type. Further, the instructions, when executed, also cause the one or more processors to determine a second subset of the plurality of seismic data having a second type. Further still, the instructions, when executed cause the one or more processors to generate a plurality of seismic reports having an arrangement of the first subset of the plurality of seismic data and the second subset of the plurality of seismic data. Even further, the instructions, when executed, cause the one or more processors to determine a quality score associated with each seismic report of the plurality of seismic reports. Even further, the instructions, when executed, cause the one or more processors to generate a seismic data filtering model based on the quality scores of the plurality of seismic reports, wherein the seismic data filtering model stores relationships between the quality scores and the seismic data.

Various refinements of the features noted above may be made in relation to various aspects of this disclosure. Further features may also be incorporated in these various aspects as well. These refinements and additional features may be made individually or in any combination. For instance, various features discussed below in relation to one or more of the illustrated embodiments may be incorporated into any of the above-described aspects of this disclosure alone or in any combination. The brief summary presented above is intended only to familiarize the reader with certain aspects and contexts of embodiments of this disclosure without limitation to the claimed subject matter.

For clarity and simplicity of description, not all combinations of elements provided in the aspects of the invention recited above have been set forth expressly. Notwithstanding this, the skilled person will directly and unambiguously recognize that unless it is not technically possible, or it is explicitly stated to the contrary, the consistory clauses referring to one aspect of the embodiments described herein are intended to apply mutatis mutandis as optional features of every other aspect of the invention to which those consistory clauses could possibly relate.

BRIEF DESCRIPTION OF THE DRAWINGS

Various features, aspects, and advantages of this disclosure will become better understood when the following detailed description is read with reference to the accompanying figures in which like characters represent like parts throughout the figures, wherein:

FIG. 3 is a flow diagram of an example method for generating a seismic data filtering model, according to one or more embodiments of this disclosure;

FIG. 4 is a flow diagram of an example method for filtering seismic data, according to one or more embodiments of this disclosure;

DETAILED DESCRIPTION

Figure 1:
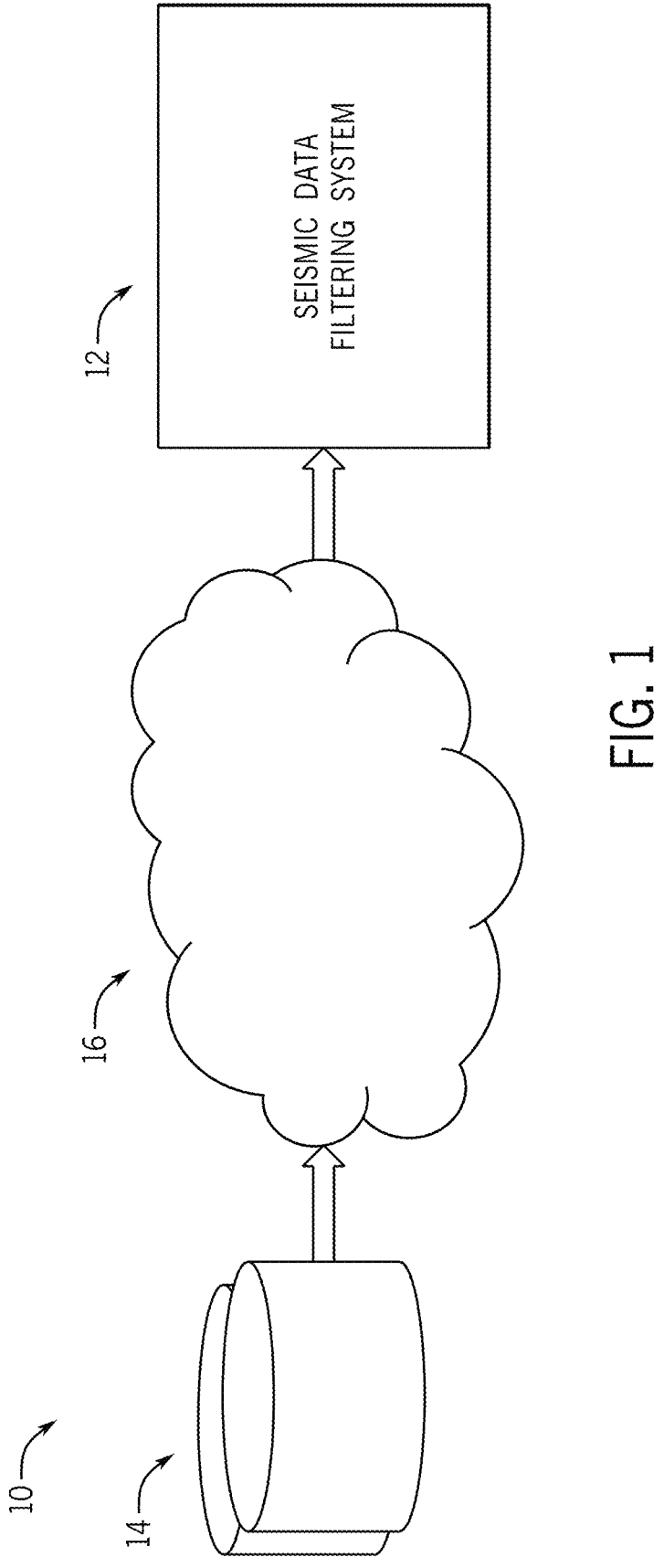
FIG. 1 illustrates a schematic diagram of a seismic data filtering system in communication with a database via a network, according to one or more embodiments of this disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The drawing figures are not necessarily to scale. Certain features of the embodiments may be shown exaggerated in scale or in somewhat schematic form, and some details of conventional elements may not be shown in the interest of clarity and conciseness. Although one or more embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

When introducing elements of various embodiments of this disclosure, the articles "a," "an," and "the" are intended to mean that there are one or more of the elements. The terms "including" and "having" are used in an open-ended fashion, and thus should be interpreted to mean "including, but not limited to . . . " Any use of any form of the terms "couple," or any other term describing an interaction between elements is intended to mean either an indirect or a direct interaction between the elements described.

Certain terms are used throughout the description and claims to refer to particular features or components. As one skilled in the art will appreciate, different persons may refer to the same feature or component by different names. This document does not intend to distinguish between components or features that differ in name but not function, unless specifically stated.

Reference throughout this specification to "one embodiment," "an embodiment," "embodiments," "some embodiments," "certain embodiments," or similar language means that a particular feature, structure, or characteristic described in connection with the embodiment may be included in at least one embodiment of this disclosure. Thus, these phrases or similar language throughout this specification may, but do not necessarily, all refer to the same embodiment. Although this disclosure has been described with respect to specific details, it is not intended that such details should be regarded as limitations on the scope of this disclosure, except to the extent that they are included in the accompanying claims.

Additionally, the methods and processes described below may be performed by a processor. Moreover, the term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described below.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described below, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described below can be implemented using such logic devices.

Oil and gas enterprises utilize seismic data to inform certain oil and gas decisions, such as determining where to drill and/or whether a location is an area of interest for prospecting. The seismic data may be stored in one or more databases (e.g., cloud storage), such that the seismic data is readily accessible to a user. The seismic data may be accessed to inform the oil and gas decisions and/or to perform a quality control check of the seismic data. For example, as seismic data analysis techniques improve, it may be advantageous to reanalyze previously recorded seismic data to determine whether new insights may be gained using improved seismic data analysis techniques. In any case, oil and gas enterprises may access, monitor, and utilize relatively large volumes of seismic data to inform oil and gas decisions. However, due to the large volume of the seismic data, it may be difficult for a user to analyze the resource data in an efficient manner.

Accordingly, the present disclosure is directed to a seismic data filtering system that is capable of generating a seismic data filtering model to improve the efficiency and effectiveness of seismic data management and utilization. The disclosed seismic data filtering model stores relationships between seismic data and a quality indicator (e.g., a quality score). As described in further detail herein, the quality indicator is a numerical and/or alphabetical representation indicating how suitable seismic data is for facilitating oil and gas decisions. To generate the seismic data filtering model, the seismic data filtering system assembles input seismic data into seismic reports. As used herein, a seismic report is a software file or an electronic document that includes a predetermined combination of particular types of seismic data and/or a predetermined arrangement of seismic data within the software file. The seismic data filtering system determines a quality indicator (e.g., based on user input) for each seismic report. Further, the seismic data filtering system may determine relationships between the seismic data, such as the type of the seismic data and/or features of the seismic data, and the quality indicators. The seismic data filtering model stores these relationships and/or correlations, which may be used to determine quality indicators of other assembled seismic reports. Using the relationships and/or correlations between the seismic data and the quality score, the seismic data filtering system may determine whether seismic reports (i.e., the seismic data of the seismic report) should be used to inform oil and gas operations, receive additional review (e.g., by an operator), or no longer be used, thereby freeing up computational sources. In this way, the disclosed techniques may improve the efficiency of oil and gas decisions related to using and maintaining seismic data.

With the preceding in mind, FIG. 1 illustrates a schematic diagram of a system 10 that includes a seismic data filtering system 12 in communication with a database 14 via a network 16. In general, the database 14 may store seismic data, including amplitude plots, trace header plots, vector head mappings, geographic location maps, and other types of visual representations of seismic data. In some embodiments, the seismic data may include data derived by seismic sources and seismic receivers associated with seismic surveys of geological formations. In any case, it may be desirable to utilize the seismic data stored in the database 14 to inform oil and gas decisions. As described in further detail herein, the seismic data filtering system 12 may retrieve the data stored in the database 14 and generate a geographic data visualization that enables a user to more efficiently parse the data, and thereby make decisions more rapidly.

Figure 2:
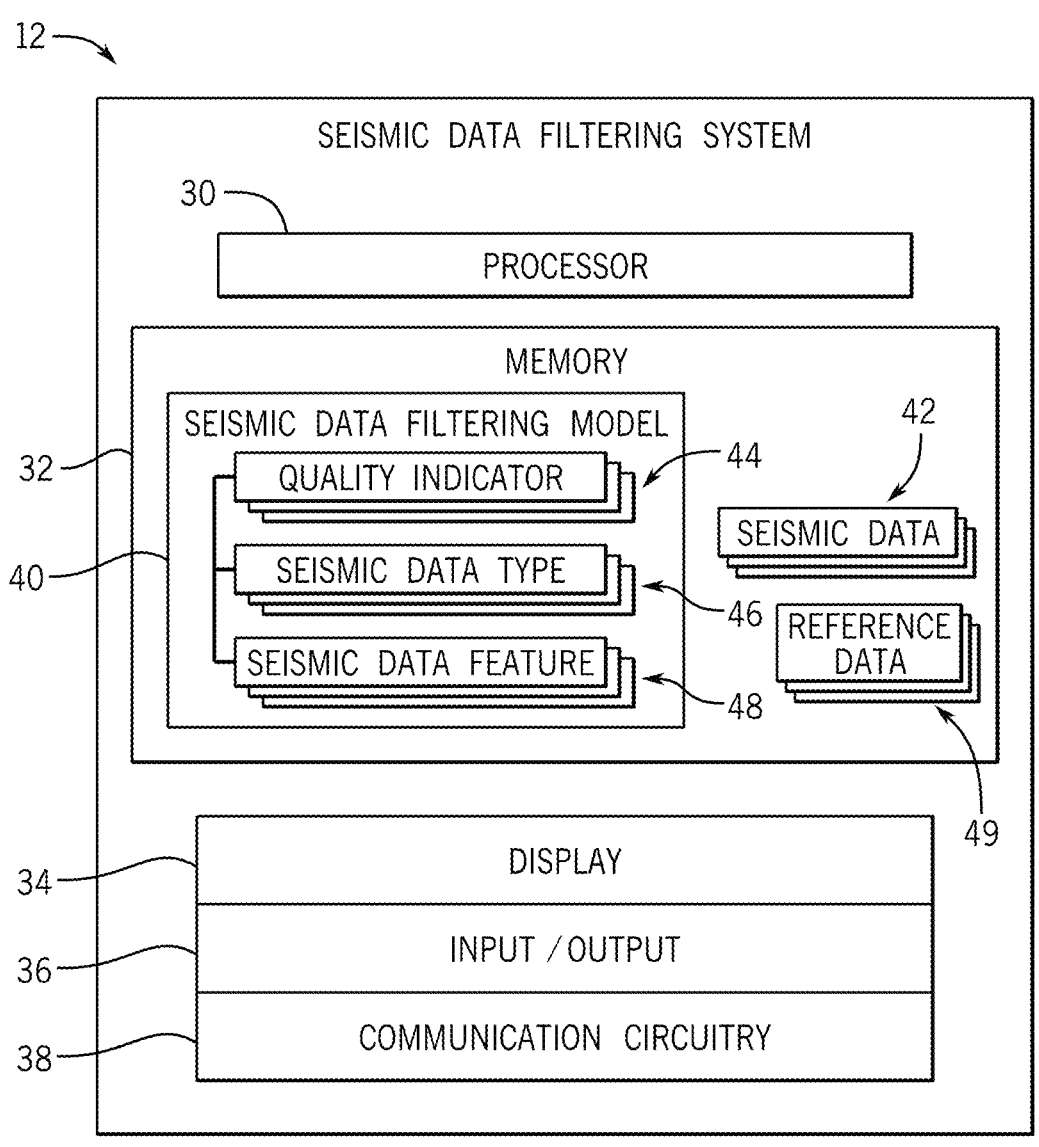
FIG. 2 illustrates a block diagram of various components that may be part of the seismic data filtering system, according to one or more embodiments of this disclosure.

To perform the operations described herein, the seismic data filtering system 12 may include one or more hardware elements (including circuitry), software elements (including machine-executable instructions) or a combination of both hardware and software elements (which may be referred to as logic). FIG. 2 is a block diagram illustrating the seismic data filtering system 12, in accordance with aspects of the present disclosure. It should be noted that FIG. 2 is merely one example of a particular implementation and is intended to illustrate the types of components that may be present in the seismic data filtering system 12.

The seismic data filtering system 12 may include a processor 30, a memory 32, an electronic display 34, input/output components (I/O) 36, and communication circuitry 38 to enable the seismic data filtering system 12 to communicate with external storage components, such as cloud storage or the database 14. In some embodiments, the seismic data filtering system 12 may store and/or execute an application in the memory 32 to be executed by the processor 40 that facilitates communication with the database 14.

The communication circuitry 38 may include, for example, communication circuitry for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a 3rd generation (3G) cellular network, universal mobile telecommunication system (UMTS), 4th generation (4G) cellular network, long term evolution (LTE®) cellular network, long term evolution license assisted access (LTE-LAA) cellular network, 5th generation (5G) cellular network, and/or New Radio (NR) cellular network, a 6th generation (6G) or greater than 6G cellular network, a satellite network, a non-terrestrial network, and so on.

As illustrated, the memory 32 of the seismic data filtering system 12 may store a seismic data filtering model 40 and seismic data 42. In general, the seismic data filtering model 40 stores relationships between one or more quality indicators 44 (e.g., quality score), one or more seismic data types 46, and one or more seismic data features 48. In general, the quality indicator 44 may be a numerical and/or alphabetical representation indicative of the quality of seismic data 42. In certain embodiments, the quality indicator 44 may be a numerical value (e.g., integer) over a numerical range of 0 to 10, 0 to 100, 0 to 1000, or the like, wherein a low numerical value indicates low quality and a high numerical value indicates high quality. For example, the quality indicator 44 may be 0 for low quality seismic data 42 or 100 for a higher quality seismic data. In some embodiments, the quality indicator may be a word or phrase indicating the quality (e.g., high or low), such as "acceptable", "unacceptable", or "requires further review".

The seismic data type 46 may be a numerical and/or alphabetical representation of the type of the seismic data 42. For example, the seismic data type 46 may indicate whether the seismic data 42 is an amplitude plot, a trace header plot, a vector head mapping, geographic location maps, and other types of visual representations of seismic data. In some embodiments, the seismic data type 46 may include a type of acquisition system or seismic source that may indicate the type of graph or plot. The seismic data features 48 include an indication of the range of the seismic data, missing data, relatively high noise, the continuity of the seismic data, anomalies in the seismic data. In general, the seismic data filtering model 40 stores relationships or correlations between the quality indicators 44 and the seismic data type 46. The quality indicator 44 may be weighted towards a particular seismic data type 46 and/or seismic data feature 48. For example, the seismic data filtering model 40 may store numerical weights corresponding to particular seismic data types 46.

Additionally, the memory 32 may store reference data 49. In general, the reference data 49 (e.g., seismic training data, reference seismic data) may include similar data types as the seismic data 42. However, the reference data 49 is used to train and/or re-train the seismic data filtering model 40 and/or refine the seismic data filtering model 40. As such, the reference data 49 may include training data and/or previously scored seismic reports and/or seismic data 42.

As described herein, the seismic data filtering system 12 may be capable of generating, training, or verifying a seismic data filtering model 40 that filters seismic data in a database based on the quality score of the seismic data, thereby reducing computational resources that could otherwise be used to manage other data. With this in mind, FIG. 3 is a flow diagram of an example computer implemented method 50 for generating a seismic data filtering model 40, according to one or more embodiments of this disclosure. In general, certain process blocks performed in the method 50 may be performed by the processor 30 of the seismic data filtering system 12. Moreover, certain process blocks described below may be performed in a different order than that illustrated, and, indeed, in some embodiments, certain process blocks may be skipped altogether.

At block 52, the processor 30 retrieves, receives, or otherwise obtains seismic data for training a model, such as the reference data 49 (e.g., seismic training data). As described herein, the reference data 49 may include generally similar types of seismic data as the seismic data 42. For simplicity, the reference data 49 is referred to as seismic data 42 with respect to the discussion of FIG. 3. The seismic data 42 may include amplitude plots, trace header plots, geographic location maps, and other types of data from a plurality of sources. At least in some instances, the seismic data 42 may include metadata that indicates information that may be used to determine relationships between seismic data 42 (e.g., based on location or time). For example, a first set of seismic data 42 may include metadata indicating a first location, and a second set of seismic data 42 may include metadata indicating a second location, and so on. As such, the processor 30 may group, arrange, or organize the sets of seismic data based on their respective locations. As another non-limiting example, the metadata may indicate a time period when the seismic data 42 was obtained. Accordingly, the processor 30 may group, arrange, or organize the sets of seismic data 42 that were obtained within similar time periods or within a threshold time period (e.g., weeks, months, or years). The resource data may be stored in a storage component, such as the database 14.

At block 54, the processor 30 generates a seismic report using the seismic data 42. In general, the seismic report is an aggregate of multiple types or combinations of seismic data. In some embodiments, the seismic report may be an arranged list of seismic data 42. As such, to generate the seismic report, the processor 30 may determine a ranking or relative arrangement of the seismic data 42. In some embodiments, the processor 30 may arrange or rank the seismic data 42 based on identified error features within the seismic data. As referred to herein, the "error features" include seismic data features 48 that are anomalous or have unexpected data patterns in the seismic data, such as missing gaps of data, discontinuities, unexpected asymptotes, misaligned geographic map boundaries, noise exceeding a threshold noise level, and other anomalies or errors described in more detail herein. The processor 30 may arrange or rank seismic data 42 based on increasing or decreasing number of identified error features (e.g., seismic data features 48). As another non-limiting example, the processor 30 may arrange or rank seismic data 42 based on a severity rating corresponding to the identified error features. That is, the processor 30 may determine a magnitude of the error features and arrange or rank the seismic data based on increasing or decreasing severity rating corresponding to the identified error features.

In some embodiments, the seismic report is a software file or an electronic document that is configured to display the seismic data 42 on an electronic display of a suitable processor-based computing device. To generate the seismic report, the processor 30 may assign or arrange each seismic data 42 in one or more locations on an electronic document. For example, the processor 30 may arrange seismic data 42 that is an amplitude plot in a first location, geographic maps in a second location, and so on. It is presently recognized that arranging the seismic data 42 aid an operator in monitoring seismic reports, and the corresponding seismic data 42, by making certain information more readily discernable.

In some embodiments, the seismic report may include a particular arrangement and/or combination of the seismic data 42. For example, each seismic report may include a first type of seismic data (e.g., an amplitude plot) and a second type of seismic data (e.g., geographic location maps). At least in some instances, the different types of seismic data (e.g., the first type of seismic data and the second seismic data) may be arranged in a single document or file (e.g., .doc, .pdf, .eps, or other file type that includes visual representations of data). Further, the different types of seismic data may be arranged in particular locations within the document or file. It is presently recognized that generating an electronic document having a predetermined arrangement or layout for the different types of seismic data (e.g., a template) may facilitate training the seismic data filtering model 40 to identity features indicating the quality of the seismic data, as described in more detail below.

At block 56, the processor 30 determines a quality score associated with the seismic reports. In general, the quality indicator 44 may be a numerical and/or alphabetical representation or value that indicates whether the seismic report, or one or more portions of the seismic report (i.e., the seismic data) is suitable for use in oil and gas operations as described herein. In some embodiments, the processor 30 may receive the quality indicator 44 from an operator. In some embodiments, the seismic reports and/or each seismic data 42 may include previously assigned quality indicators 44. Accordingly, the processor 30 may generate an aggregate quality indicator 44 indicating whether the seismic report is suitable for use to inform oil and gas operations as described herein with respect to eqn. 1. It is presently recognized that it may be advantageous to establish a relationship or correlation between a quality indicator 44 of a seismic report and seismic data 42. As such, a processor 30 may utilize the relationship or correlation between the quality indicator 44 and the seismic data 42 to determine a quality score for a seismic report.

At block 58, the processor 30 generates the seismic data filtering model 40 using the seismic reports. In general, the seismic data filtering model 40 may be trained using suitable machine-learning (ML), artificial intelligence, or neural network techniques. In general, the seismic data filtering model 40 stores relationships or correlations between the quality indicator 44 and the seismic data 42. For example, the seismic data filtering model 40 may store a first relationship between certain error features in seismic data 42 and the quality indicator 44, a second relationship between the type of seismic data 42 and the quality indicator 44, a third relationship between a severity rating of the error features and the quality indicator 44, or a combination thereof. As described in more detail below, the determined relationships may aid operators in monitoring seismic data 42 by reducing the volume of seismic data 42 they may otherwise monitor.

In some embodiments, generating the seismic data filtering model 40 may include using previously scored seismic data 42 and/or seismic reports. That is, the processor 30 may receive seismic data 42 that was previously analyzed by an operator or otherwise scored using a suitable computing device. For example, the processor 30 may have assigned a score for only a portion of the seismic data 42 of the seismic report. Accordingly, the processor 30 may identify the presence and/or absence of features corresponding to the portion of the seismic data 42 that has an assigned score. In turn, the processor 30 may determine a relationship between the assigned score and the presence and/or absence of the features, and the processor 30 may utilize the relationship to determine a quality score for other seismic data 42.

In some embodiments, the processor 30 may dynamically update the seismic data filtering model 40 using previously scored seismic reports. For example, the processor 30 may receive a seismic report and/or seismic data 42 tagged with reference data 49 that indicates one or more seismic data 42 of the seismic report was rejected by a user or otherwise received user input indicating that the processor 30 previously assigned an incorrect quality score (e.g., outside of a desired range) for the seismic data 42. As such, the processor 30 may update the stored relationships between the assigned score and the presence and/or absence of features such that the processor 30 based on the reference data 49. For example, the processor 30 may adjust (e.g., increase or decrease) a weighted value associated with seismic data 42 such the processor 30 may assign a quality score within the desired range if the processor 30 receives seismic data with similar features as the seismic data tagged with reference data 49. In some embodiments, the processor 30 may adjust the weighted value based on the type of error features present in the seismic data 42 tagged with reference data. Additionally or alternatively, the processor 30 may determine that an additional quality indicator may be useful for determining the quality score. In some embodiments, the processor 30 may receive the seismic report with the reference data 49 from an ingestion remediation system, which is described in more detail with respect to FIG. 5. In this way, the processor 30 may use reference data 49 to supervise the training and/or re-training of the seismic data filtering model 40 As such, the seismic data filtering model 40 may be a dynamic model, which is modified or updated after it is generated using feedback.

At least in some instances, one or more of the blocks 52, 54, 56, and 58 may be repeated through multiple iterations. For example, the processor 30 may refine the seismic data filtering model 40 by performing blocks 52, 54, and 56 one or more additional times after generating an initial seismic data filtering model 40.

FIG. 4 is a flow diagram of an example computer implemented method 60 for using the seismic data filtering model 40 to filter seismic data 42. In general, certain process blocks performed in the method 60 may be performed by the processor 30 of the seismic data filtering system 12. Moreover, certain process blocks described below may be performed in a different order than that illustrated, and, indeed, in some embodiments, certain process blocks may be skipped altogether.

At block 62, the processor 30 receives seismic data 42. In general, the processor 30 may receive seismic data 42 at block 62 that has a generally similar type to the seismic data 42 described for block 52 of FIG. 3. As described in more detail below, the seismic data 42 received at block 62 is ultimately provided as input to the seismic data filtering model 40. For example, the processor 30 may receive multiple types of seismic data 42 for different locations and/or time periods. That is, the processor 30 may receive a first set of seismic data 42 having a first type, and the processor 30 may receive a second set of seismic data 42 having a second type. As discussed herein, the types of seismic data 42 may include amplitude plots, trace header plots, vector head mappings, geographic location maps, or a combination thereof. Further, each seismic data 42 of the first set and the second set may be associated with different locations and/or time periods. Accordingly, as described below, the processor 30 may generate seismic reports using the different sets (e.g., the first set and the second set) of seismic data 42 and provide the seismic reports to the seismic data filtering model 40.

At block 64, the processor 30 generates seismic reports using the seismic data 42. In general, the processor 30 may perform block 64 in a generally similar manner as described in block 54 of FIG. 3. In some embodiments, the processor 30 may organize or arrange the seismic data 42 based on metadata or other data indicating a geographical region or time period corresponding to acquisition of the seismic data 42. For example, the processor 30 may organize the seismic data 42 into a first set of seismic data 42 corresponding to a first location and a second set of seismic data 42 corresponding to a second location. As such, the processor 30 may generate a first seismic report using the first set of seismic data 42. Accordingly, the first seismic report may be a document or file that includes a particular or predetermined arrangement of seismic data 42 corresponding to the first location. Further, the processor 30 may generate a second seismic report using the second set of seismic data 42. As such, the second seismic report may be an electronic document or file that includes a particular or predetermined arrangement of seismic data 42 corresponding to the second location.

At block 66, the processor 30 filters the seismic reports using the seismic data filtering model 40 to generate the subset of seismic reports. As described herein, the seismic data filtering model 40 may store relationships or correlations between a quality indicator 44 and the seismic data 42. For example, the seismic data filtering model 40 may store a first relationship between certain error features in seismic data 42 and the quality indicator 44, a second relationship between the type of seismic data 42 and the quality indicator 44, a third relationship between a severity rating of the error features and the quality indicator 44, or a combination thereof. The error features may include missing gaps of data, unexpected asymptotes, misaligned geographic map boundaries, noise exceeding a threshold noise level, and other anomalies or errors described in more detail herein. To determine the error features, the processor 30 may utilize object-based image analysis techniques to identify characteristics of particular types of seismic data 42 as well as anomalies that deviate from the characteristics. Further, the type of seismic data 42 may include amplitude plots, trace header plots, vector head mappings, geographic location maps, and other types of visual representations of seismic data 42. In general, the processor 30 may identify the type of seismic data 42 based on features such as the relative arrangement of the data, an axis label, presence of lines, images, or a combination thereof.

The severity rating may be a numerical and/or alphabetical representation indicating a relative importance of a type of seismic data 42 or quality indicators, such as a weighted value. To determine the severity rating, the processor 30 may access reference data stored in the memory that indicates the severity rating. Additionally or alternatively, the processor 30 may determine the severity rating based on incorrectly assigned quality indicators from previous seismic reports. That is, the processor 30 may utilize closed-loop feedback based on input (e.g., an expected quality indicator, an indication that the quality indicator should be above a threshold and not below, and/or user input) to adjust quality scores for types of seismic data 42 to determine a quality indicator of the seismic report that matches, or more closely matches, the input.

In any case, the processor 30 may filter the seismic reports by determining or calculating a quality indicator 44 for each seismic report and output the subset having a quality indicator 44 within a quality indicator threshold. For example, the processor 30 may iteratively provide each seismic report to the seismic data filtering model 40 and receive, for each seismic report, an indication of whether the seismic report has a quality indicator 44 that exceeds or is below a threshold. Further, the processor 30 may group the seismic reports that exceed one or more thresholds, which may be assembled into a filtered seismic data output, as described herein.

In some embodiments, the quality indicator 44 of a seismic report represents an aggregate, combined, or averaged numerical score of the seismic data 42 corresponding to the seismic report. Eqn. 1 shows a non-limiting example of an equation for calculating the quality indicator 44 of a seismic report:

$$Q = \Sigma a_i q_i \qquad (1)$$

where Q is the quality indicator 44 of a seismic report (e.g., combined quality indicator, aggregate quality indicator, or average quality indicator), q is a quality score associated with each seismic data 42, i, of the seismic report, and a is a weighted value for the quality score for each seismic data 42. In some embodiments, for each report, one or more of the different seismic data 42 may have the same or different quality scores and/or weight values. For example, certain types of seismic data 42 and/or seismic reports may provide a clearer indication of whether associated seismic data 42 has a suitable quality. For example, it may be desirable for the weighted value corresponding to 3D data to be relatively higher as compared to other types of seismic data. As such, the processor 30 may analyze each seismic report that include 3D seismic data. In this example, the quality indicator of each seismic report is more indicative of the quality of the any 3D seismic data as compared to other types of data that are included in the seismic report.

To determine the quality indicator 44, q, for each seismic data 42, the processor 30 may determine whether the seismic data 42 of the seismic reports include any error features. As described herein, the error features include anomalies or unexpected data patterns in the seismic data 42, such as missing gaps of data, unexpected asymptotes, misaligned geographic map boundaries, noise exceeding a threshold noise level, and other anomalies or errors described in more detail herein. As such, the processor 30 may assign a numerical score based on the presence or absence of the error feature. For example, the processor 30 may assign a negative value as q for the presence of an error feature or a number between 0 to 100 based on the number of identified error features. To determine the error features, the processor 30 may use suitable object-based image analysis techniques and trained using machine-learning techniques as would be understood by one of ordinary skill in the art.

At block 68, the processor 30 provides or outputs a subset (e.g., a filtered subset) of the seismic reports to a computing device, such as a laptop computer, mobile device, desktop computer, tablet, or other computing device capable of receiving the subset of seismic reports or displaying the subset of seismic reports. For example, the processor 30 may output a filtered seismic data output (e.g., as described in FIG. 5) that include a set of seismic reports having a quality indicator that exceeds a quality indicator threshold, which corresponds to seismic reports that are suitable for informing oil and gas operations. Additionally or alternatively, the processor 30 may output a filtered data output that includes a set of seismic reports having a quality indicator that is below a quality indicator threshold, which corresponds to seismic reports that may not be suitable for informing oil and gas operations.

Figure 5:
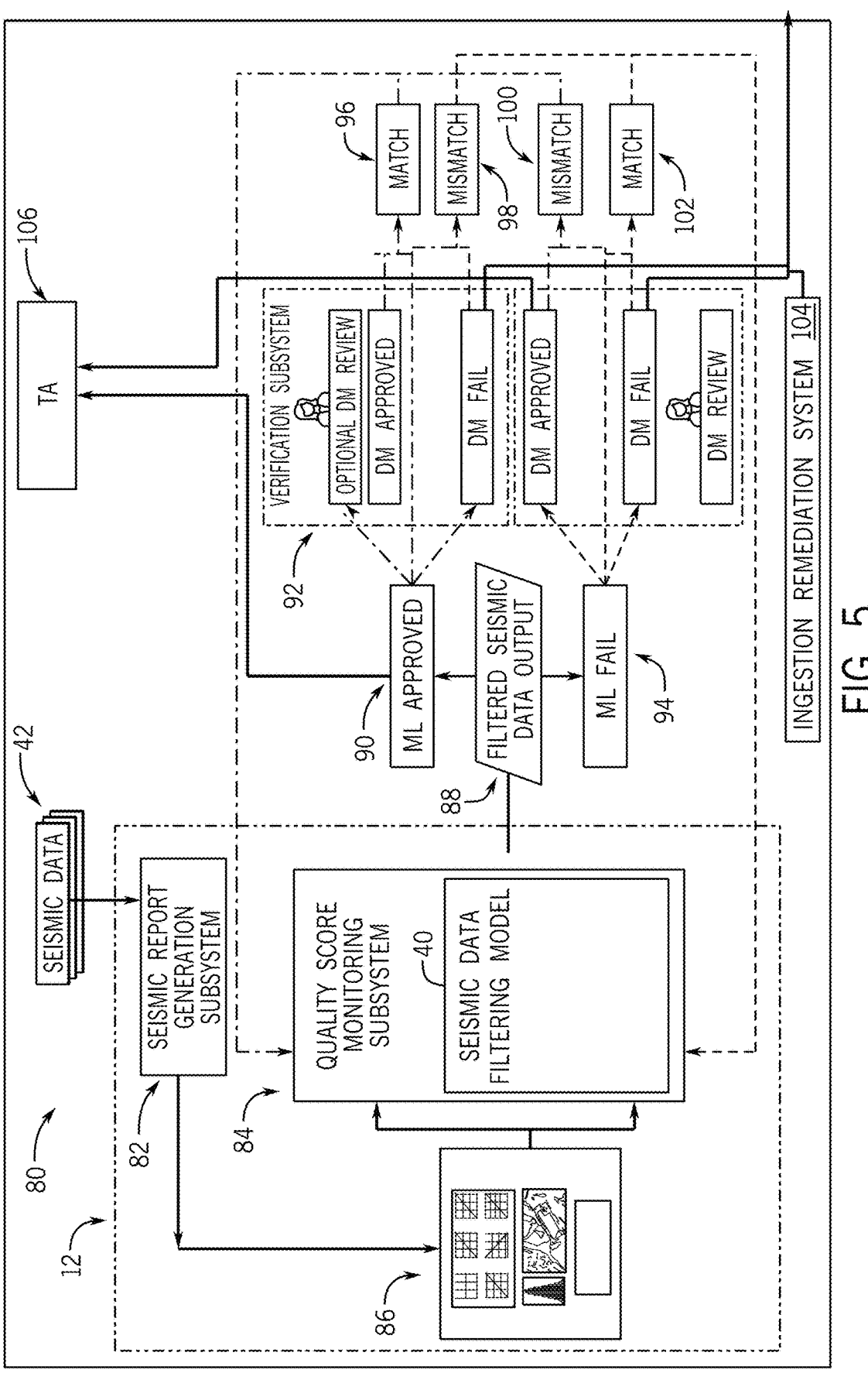
FIG. 5 is a data flow diagram that includes the seismic data filtering system of FIG. 2 that generates seismic reports using seismic data, according to one or more embodiments of this disclosure.

FIG. 5 shows a flow diagram of an embodiment of a seismic data monitoring system 80 that includes the seismic data filtering system 12. The seismic data filtering system 12 includes a seismic report generation subsystem 82 and a quality score monitoring subsystem 84. The seismic report generation subsystem 82 generally receives seismic data 42 (e.g., acquires or obtains seismic data 42 stored in the database 14) and assembles a seismic report 86 using multiple seismic data 42. To assemble the seismic report 86, the seismic report generation subsystem 82 performs generally similar operations as described with respect to block 64 of FIG. 4. In some embodiments, the seismic report generation subsystem 82 may perform one or more processing steps before generating the seismic report 86. For example, the seismic report generation subsystem 82 may pre-process the seismic data 42 by denoising seismic data, identifying metadata tags used to group or cluster seismic data 42, format (e.g., truncate or adjust axes for graphs), converting seismic data 42 to one or more formats, and other suitable processing steps to normalize seismic data 42 of similar types. In general, the seismic report generation subsystem 82 may perform substantially similar steps as described with respect to block 54 of FIG. 3 and/or block 64 of FIG. 4.

The quality score monitoring subsystem 84 generally determines a quality indicator 44 for the seismic reports 86 output by the seismic report generation subsystem 82 using the seismic data filtering model 40. As described herein, the seismic data filtering model 40 may store relationships or correlations between a quality indicator 44 and the seismic data 42. For example, the quality score monitoring subsystem 84 may identify features, such as error features, within each seismic report 86 and determine a quality indicator 44 using the identified features and/or reference seismic reports that were previously scored (i.e., with a quality indicator). To determine the quality indicator 44, the quality score monitoring subsystem 84 may assign quality scores q for each seismic data 42 of the seismic report using the presence or absence of error features. Additionally or alternatively, the quality score monitoring subsystem 84 may identify reference seismic reports (e.g., stored in the database 14) that have similar seismic data 42 and/or error features. In some embodiments, the seismic data filtering system 12 may generate the reference seismic reports, which may be used as baseline reports and/or baseline correlations with quality indicators.

The quality score monitoring subsystem 84 may determine the quality indicators 44 associated with the reference seismic reports and determine a corresponding score for the seismic report 86. For example, the quality score monitoring subsystem 84 may determine a contribution (e.g., $a_i q_i$) from substantially similar seismic data 42 from one or more seismic reports. As referred to herein, "substantially similar" seismic data 42 include seismic data 42 that include the same error features and/or magnitude of error features. For example, the quality score monitoring subsystem 84 may determine a discontinuity in seismic data 42 over a first axis range. Then, the quality score monitoring subsystem 84 may identify a seismic data 42 from a scored reference seismic report that has a discontinuity over a second axis range that is within a threshold range of the first axis range (e.g., the first axis range is 1%, 2%, 3%, 4%, 5%, or 10% broader or smaller than the second axis range). In turn, the quality score monitoring subsystem 84 may calculate a quality score, Q, using the contribution from the substantially similar seismic data 42. At least in some instances, the quality score monitoring system 84 may determine a quality indicator that indicates a quality report is acceptable, although a particular quality indicator of a seismic data 42 is relatively low (e.g., when the weighted value is relatively low). Accordingly, it may be advantageous to flag or emphasize, as discussed in more detail herein, the seismic data 42 that has a quality score, q, below a threshold, although the quality score, Q, for the report is relatively high.

The quality score monitoring subsystem 84 generates a filtered seismic data output 88. The filtered seismic data output 88 includes a listing (e.g., a ranked or arranged listing) of the seismic reports and/or a cluster of seismic reports 86. The filtered seismic data output 88 may indicate or include seismic reports 86 that are machine-learning (ML) approved reports 90. In general, the ML approved reports 90 include the seismic reports 86 that have a quality score that exceeds one or more threshold ranges indicating the seismic reports 86 may be suitable for decision making in oil and gas operations. The verification subsystem 92 receives the ML approved reports 90 and determines whether the ML approved reports 90 are suitable (e.g., a match 96) or not-suitable (e.g., mismatch 98). For example, the verification subsystem 92 may be a computing device with a display that displays the seismic reports 86 associated with ML approved reports 90 and include input/output devices that enable a user to provide an input indicating whether or not the quality score monitoring subsystem 84 assigned an appropriate score. In general, the verification subsystem 92 may utilize supervised machine learning techniques. In any case, the quality score monitoring subsystem 84 receives the matches 96 and mismatches 98, which may be used to refine the quality score assignment by the quality score monitoring subsystem 84. The verification subsystem 92 also receives seismic reports 86 indicated or included in the filtered seismic data output 88 that are below a quality score threshold.

In a generally similar manner as described above, the verification subsystem 92 may determine whether or not the quality score monitoring subsystem 84 assigned an appropriate score. For example, the verification subsystem 92 receives the ML failed reports 94 and determines whether the ML failed reports 94 are suitable (e.g., a mismatch 100) or not-suitable (e.g., match 102). In any case, the quality score monitoring subsystem 84 receives the mismatches 100 and matches 102, which may be used to refine the quality score assignment by the quality score monitoring subsystem 84. The matches 102 may be directed to a TA system 106 that may further verify the results of the verification subsystem 92 and/or quality score monitoring subsystem 84. For example, the technical assurance (TA) system 106 may include the mismatches 100 as ML approved reports 90 and, thus, the mismatches 100 may be marked as approved for consideration by an operator at the verification subsystem 92. However, the matches 102 generally correspond to seismic reports 86 having a quality score below a threshold, and thus may not be suitable for informing oil and gas operations. Accordingly, the seismic reports 86 corresponding to the matches 102 may be directed to an ingestion remediation system 104 for further consideration regarding whether or not to remove the corresponding seismic reports 86 from the database 14. In some embodiments, the ingestion remediation system 104 may flag data for correction or perform a correction of the seismic report, such as by adjusting the quality score for one or more of the seismic data 42. For example, the ingestion remediation system 104 may append, tag, or add metadata indicating that the quality score for the seismic data 42 should be within a particular threshold. In any case, the corrected or tagged seismic data 42 may be re-ingested or otherwise provided back to the quality score monitoring system 84 to determine an updated quality score for a corresponding seismic report. For example, the ingestion remediation system 104 may output the feedback (e.g., the metadata indicating the quality score for the seismic data 42 should be within a particular threshold) to the processor 30, which may store the feedback as reference data 49. As described herein, the processor 30 may use the reference data 49 to refine the seismic data filtering model 40.

Figure 6:
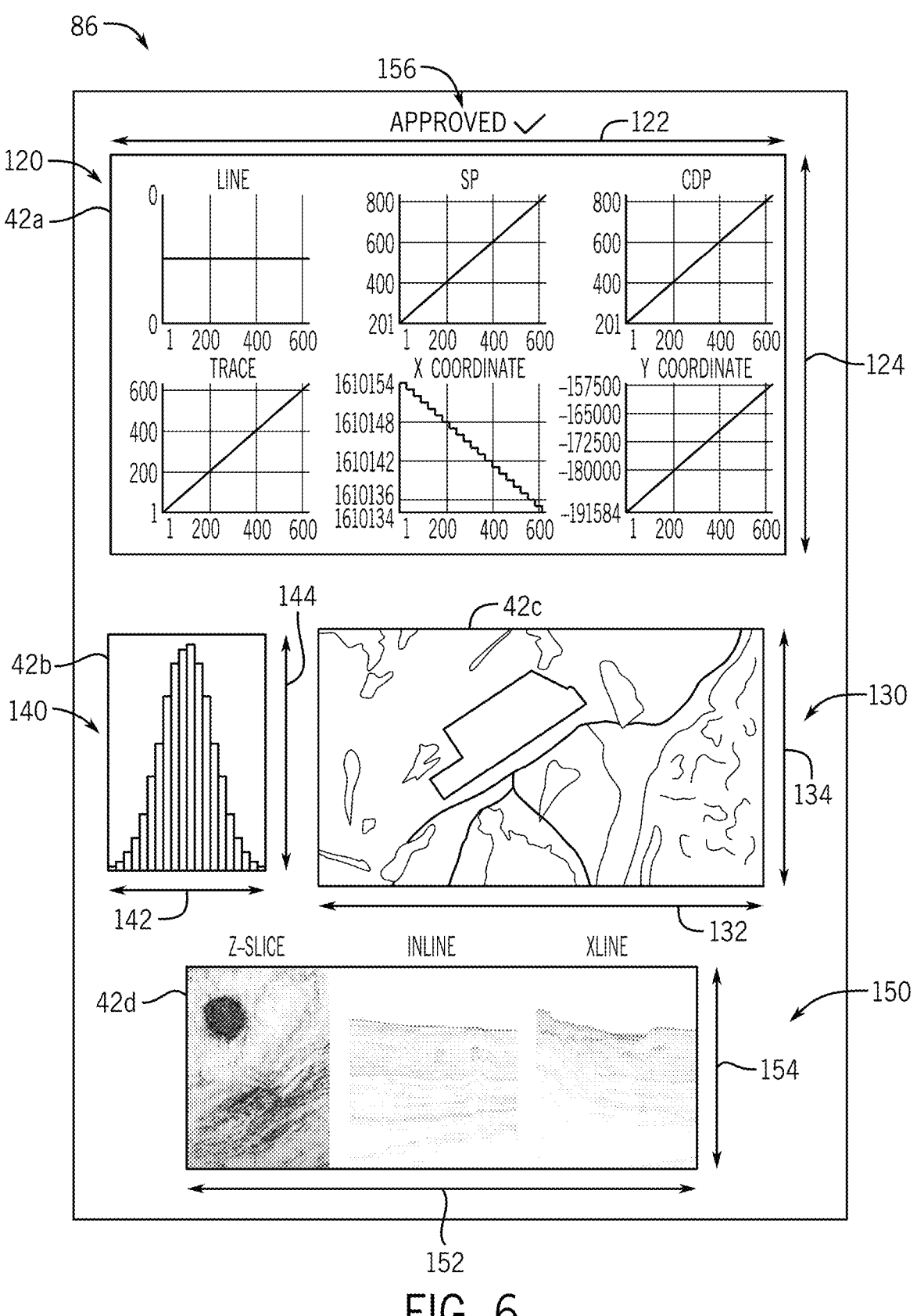
FIG. 6 is a screenshot of a first example of a seismic report, according to one or more embodiments of this disclosure.

FIG. 6 shows a screenshot of a first example of the seismic report 86 in accordance with the present disclosure. As described herein, the seismic report 86 may include seismic data 42 arranged in different positions, locations, or areas within an electronic document or file. As illustrated, the seismic report 86 includes a first seismic data 42a arranged in a first location 120 with a length 122 and a width 124. The first seismic data 42a includes a plurality of trace header plots. The seismic report 86 also includes a second seismic data 42b arranged in a second location 130 with a length 132 and a width 134. The seismic data 42b is an amplitude plot. Further, the seismic report 86 also includes a third seismic data 42c arranged in a third location 140 with a length 142 and a width 144. The third seismic data 42c is a geometry quality control (QC) plot. Further still, the seismic report 86 also includes a fourth seismic data 42d arranged in a fourth location 150 with a length 152 and a width 154. The fourth seismic data 42d includes a cross line seismic QC.

In some embodiments, the processor 30 may determine a relative arrangement of seismic data 42 based on a contribution (e.g., the weight a) of the seismic data 42 to the quality score of the seismic report 86. For example, the processor 30 may determine to arrange a first type of seismic data 42 higher or in a position that an operator is more likely to see first when weight a corresponding to the first type of seismic data 42 is higher as compared to a second type of seismic data 42 having a lower weight a. Additionally or alternatively, the processor 30 may adjust or determine the dimensions (e.g., the length and/or width, such as the length 122 and the width 123) based on the contribution of the seismic data 42 to the quality score. In this way, an operator that may review the seismic report 86 may more quickly identify certain seismic data 42 and determine whether or not to approve the seismic report 86.

In some embodiments, the processor 30 may emphasize certain seismic data 42 using different colors, larger text, bold text, a border, and so on, to emphasize seismic data 42 that should be reviewed. For example, if the processor 30 determines a first type of seismic data 42 has a quality indicator below a threshold, then the processor 30 may format, adjust, or otherwise emphasize the seismic data 42 such that when the first seismic data 42 is displayed, a user may more readily identify the first seismic data 42 for review.

In any case, the seismic report 86 may also include a quality score indicator 156. In general, the quality score indicator 156 may indicate the quality score, Q, numerically or present a message that indicates whether the seismic report 86 (i.e., the seismic data 42 of the seismic report 18) has a suitable quality for use in information oil and gas decisions are described herein. As illustrated, the quality score indicator 156 presents an "Approved" message, thereby informing an operator that the processor 30 determined, using the seismic data filtering model 40, that the quality score of the seismic report 86 exceeds a threshold or is within a threshold range.

Figure 7:
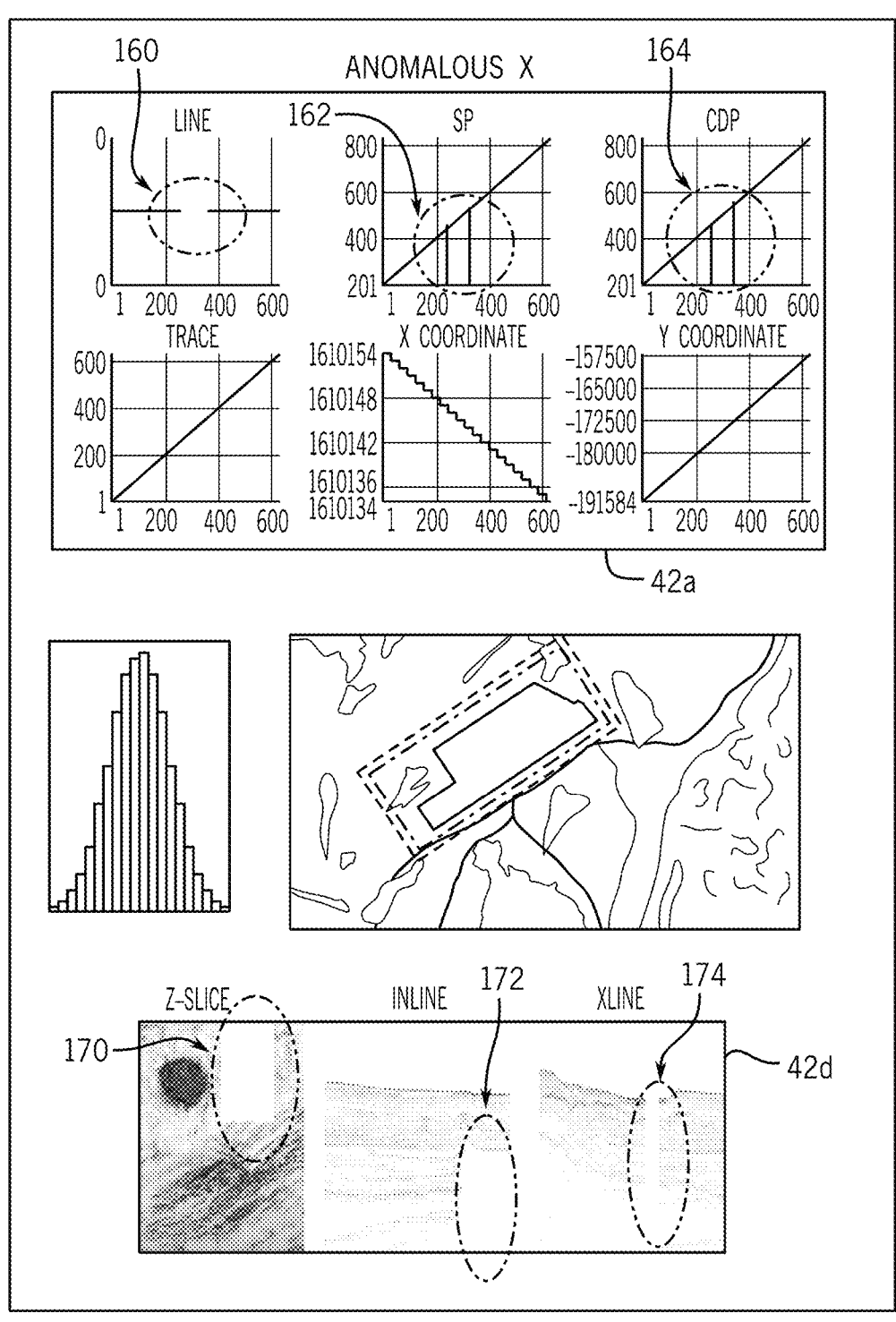
FIG. 7 is a screenshot of a second example of a seismic report, according to one or more embodiments of this disclosure.

As described herein, the processor 30 may identify error features seismic data 42 of a seismic report 86 that contribute to the quality score, Q, of the seismic report 86. FIG. 7 shows a screenshot of a second example of the seismic report 86 in accordance with the present disclosure. The seismic report 86 of FIG. 7 includes a first seismic data 42*a* and a fourth seismic data 42*d*. The first seismic data 42*a* includes error features 160, 162, and 164 that correspond to anomalies. In this case, the anomaly is a discontinuity in the data (e.g., abrupt change in the plot). The fourth seismic data 42*d* includes an error features 170, 172, and 174 that are missing data. Accordingly, the processor 30 may determine a quality score Q for the seismic report 86 of FIG. 7 based on the presence of the error features 160, 162, 170, 172, and 174. For example, the processor 30 may determine a first quality score $q_1$ based on the discontinuities in the first seismic data 42*a*. The processor 30 may also determine a second quality score $q_2$ and a third quality score $q_3$ based on the missing data in the fourth seismic data 42*d*. Accordingly, the processor 30 may determine Q based on $q_1$, $q_2$, and $q_3$. Additionally, the processor 30 may determine Q based on corresponding weights $a_1$, $a_2$, and as for the first seismic data 42*a* and the fourth seismic data 42*d*.

Figure 8:
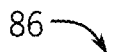
FIG. 8 is a screenshot of a third example of a seismic report, according to one or more embodiments of this disclosure.

FIG. 8 shows a screenshot of a second example of the seismic report 86 in accordance with the present disclosure. The seismic report 86 of FIG. 8 includes a first seismic data 42*a* and a second seismic data 42*b*. The second seismic data 42*b* includes error feature 180 that correspond to anomalies. In this case, the anomaly is extraneous data, noise, or an error in a measurement. The third seismic data 42*c* includes an error feature 190. In this example, the error feature 190 is based on a mismatch in the areas 192, 194, and 196, which correspond to seismic data. Accordingly, the processor 30 may determine a quality score Q for the seismic report 86 of FIG. 8 based on the presence of the error features 180 and 190. For example, the processor 30 may determine a first quality score $q_1$ based on the anomaly in the second seismic data 42*b*. The processor 30 may also determine a second quality score $q_2$ based on the mismatch in the third seismic data 42*c*. Accordingly, the processor 30 may determine Q based on $q_1$ and $q_2$. Additionally, the processor 30 may determine Q based on corresponding weights $a_1$ and $a_2$ for the second seismic data 42*b* and the third seismic data 42*c*.

While the embodiments set forth in this disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

What is claimed is:

1. A method comprising:
receiving a plurality of seismic data from a prospecting area;
generating a plurality of seismic reports each having an arrangement of different subsets of the plurality of seismic data;
determining a quality score associated with each seismic report of the plurality of seismic reports;
generating a seismic data filtering model based on the quality scores of the plurality of seismic reports, wherein the seismic data filtering model stores relationships between the quality scores and the seismic data;
indicating, via the seismic data filtering model and based on the quality scores, a location of interest for drilling within the prospecting area; and
drilling at the location of interest based on the indicating of the location of interest.

2. The method of claim 1, wherein generating the seismic reports comprises:
identifying metadata associated with the plurality of seismic data; and
clustering seismic data having substantially similar metadata to generate the different subsets of the plurality of seismic data.

3. The method of claim 1, wherein the relationships between the quality scores and the seismic data comprise relationships between the quality scores and different types of seismic data.

4. The method of claim 1, wherein the relationships between the quality scores and the seismic data comprise relationships between the quality scores and one or more features of the seismic data.

5. The method of claim 1, wherein the seismic data comprises amplitude plots, trace header plots, vector head mappings, geographic location maps, or a combination thereof.

6. The method of claim 1, comprising:
providing an additional plurality of seismic reports as input to the seismic data filtering model; and
receiving, as an output of the seismic data filtering model, a filtered subset of the seismic reports.

7. The method of claim 1, wherein the seismic reports comprise an assembled document with a respective subset of seismic data arranged in different locations.

8. The method of claim 1, wherein the subsets of the plurality of seismic reports comprise predetermined arrangement of a plurality of types of seismic data.

9. A method, comprising:
receiving a plurality of seismic data from a prospecting area;
generating a plurality of seismic reports using the plurality of seismic data, wherein each seismic report of the plurality of seismic reports comprises a different subset of the plurality of seismic data;
providing the plurality of seismic reports as input to a seismic data filtering model wherein the seismic data filtering model stores relationships between quality scores and the seismic data;
receiving, as an output of the seismic data filtering model, a filtered subset of the seismic reports;
indicating, via the seismic data filtering model and based on the filtered subset of the seismic reports, a location of interest for drilling within the prospecting area; and
drilling at the location of interest based on the indicating of the location of interest.

10. The method of claim 9, wherein the plurality of seismic data comprises a plurality of different types of seismic data.

11. The method of claim 10, wherein the different subset of the plurality of seismic data comprises a first seismic data of a first type of seismic data and a second seismic data of a second type of seismic data.

12. The method of claim 9, comprising:

receiving an additional plurality of seismic data;

generating an additional plurality of seismic reports each having an arrangement of the additional plurality of seismic data;

determining a quality score associated with each seismic report of the additional plurality of seismic reports; and generating the seismic data filtering model based on the quality scores of the additional plurality of seismic reports.

13. The method of claim 9, wherein each seismic report of the plurality of seismic reports comprises an electronic document that is configured to display at least a portion of the plurality of seismic data.

14. The method of claim 9, wherein the seismic data filtering model is configured to:

determine a quality score for each seismic report of the plurality of seismic reports;

determine a plurality of seismic reports having the quality score exceeding a threshold; and generate the filtered subset of the seismic reports based on the plurality of seismic reports having the quality score exceeding the threshold.

15. A system, comprising:

one or more processors; and a memory storing instructions that, when executed by the one or more processors, are configured to cause the one or more processors to perform operations comprising:

receiving a plurality of seismic data from a prospecting area;

determining a first subset of the plurality of seismic data;

determining a second subset of the plurality of seismic data;

generating a plurality of seismic reports having an arrangement of the first subset of the plurality of seismic data and the second subset of the plurality of seismic data;

determining a quality score associated with each seismic report of the plurality of seismic reports;

generating a seismic data filtering model based on the quality scores of the plurality of seismic reports, wherein the seismic data filtering model stores relationships between the quality scores and the plurality of seismic data;

indicating, via the seismic data filtering model and based on the quality scores, a location of interest for drilling within the prospecting area; and drilling at the location of interest based on the indicating of the location of interest.

16. The system of claim 15, wherein the instructions, when executed, are configured to cause the one or more processors to perform further operations comprising:

receiving a first weighted value for the first subset of the plurality of seismic data;

receiving a second weighted value for the second subset of the plurality of seismic data; and determining the arrangement based on the first weighted value and the second weighted value.

17. The system of claim 15, wherein the instructions, when executed, are configured to cause the one or more processors to determine the quality score comprises:

identifying one or more error features in the first subset, the second subset, or both; and determining the quality score based on a presence of the one or more error features.

18. The system of claim 17, wherein the one or more error features comprise an indication of a range of the plurality of seismic data, missing data, relatively high noise, a continuity of the plurality of seismic data, an anomaly in the plurality of seismic data, or a combination thereof.

19. The system of claim 15, wherein the instructions, when executed, are configured to cause the one or more processors to perform further operations comprising:

providing an additional plurality of seismic reports as input to the plurality of seismic data filtering model; and receiving, as an output of the plurality of seismic data filtering model, a filtered subset of the seismic reports.

20. The system of claim 15, wherein the plurality of seismic data comprises amplitude plots, trace header plots, vector head mappings, geographic location maps, or a combination thereof.

* * * * *